Oct. 25, 1966     I. K. DORTORT     3,281,642
A.-C. MEASUREMENT OF D.-C. OUTPUT OF RECTIFIERS
Filed Feb. 20, 1962     2 Sheets-Sheet 1
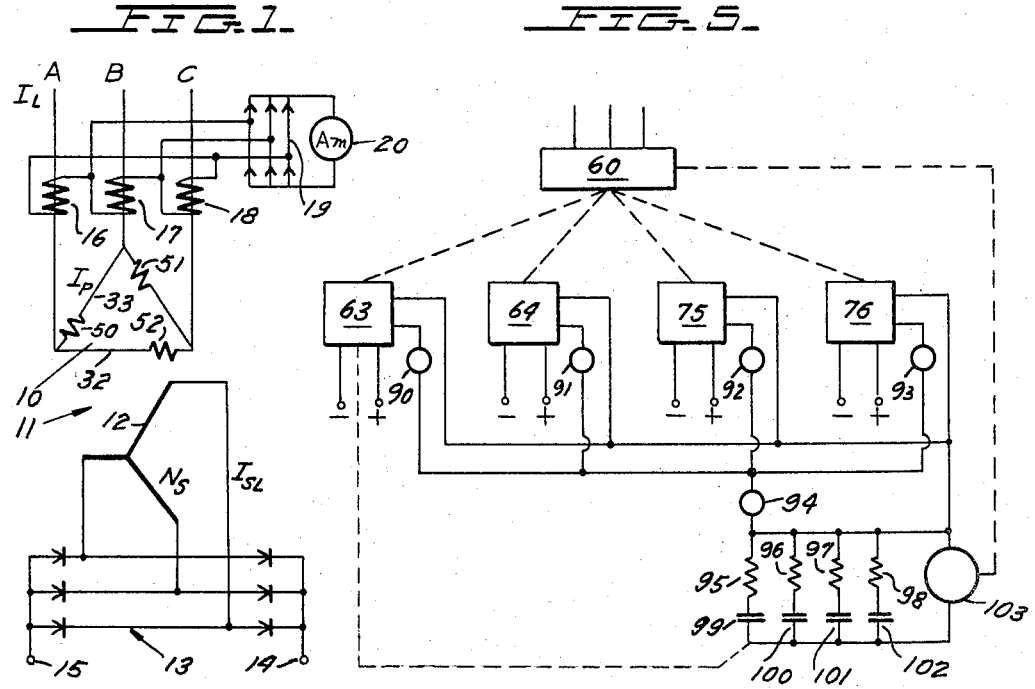
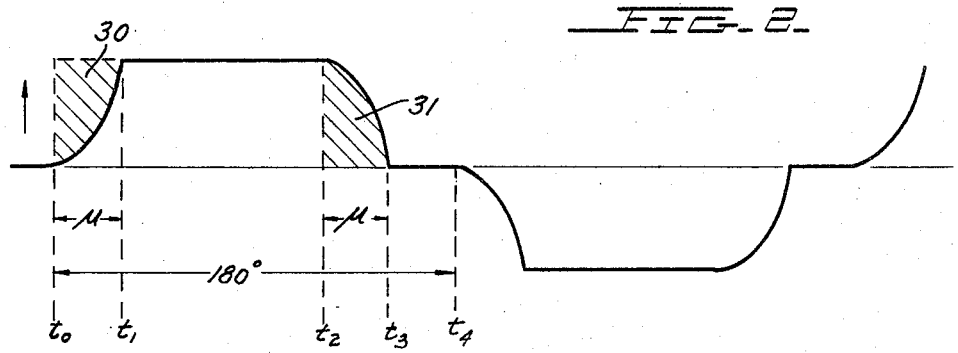
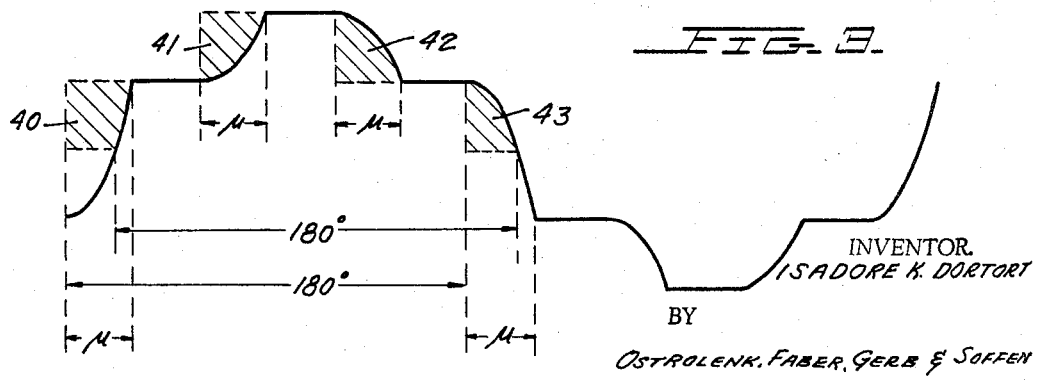
INVENTOR.
ISADORE K. DORTORT
BY
OSTROLENK, FABER, GERB & SOFFEN
ATTORNEYS Oct. 25, 1966  I. K. DORTORT  3,281,642
A.-C. MEASUREMENT OF D.-C. OUTPUT OF RECTIFIERS
Filed Feb. 20, 1962  2 Sheets-Sheet 2
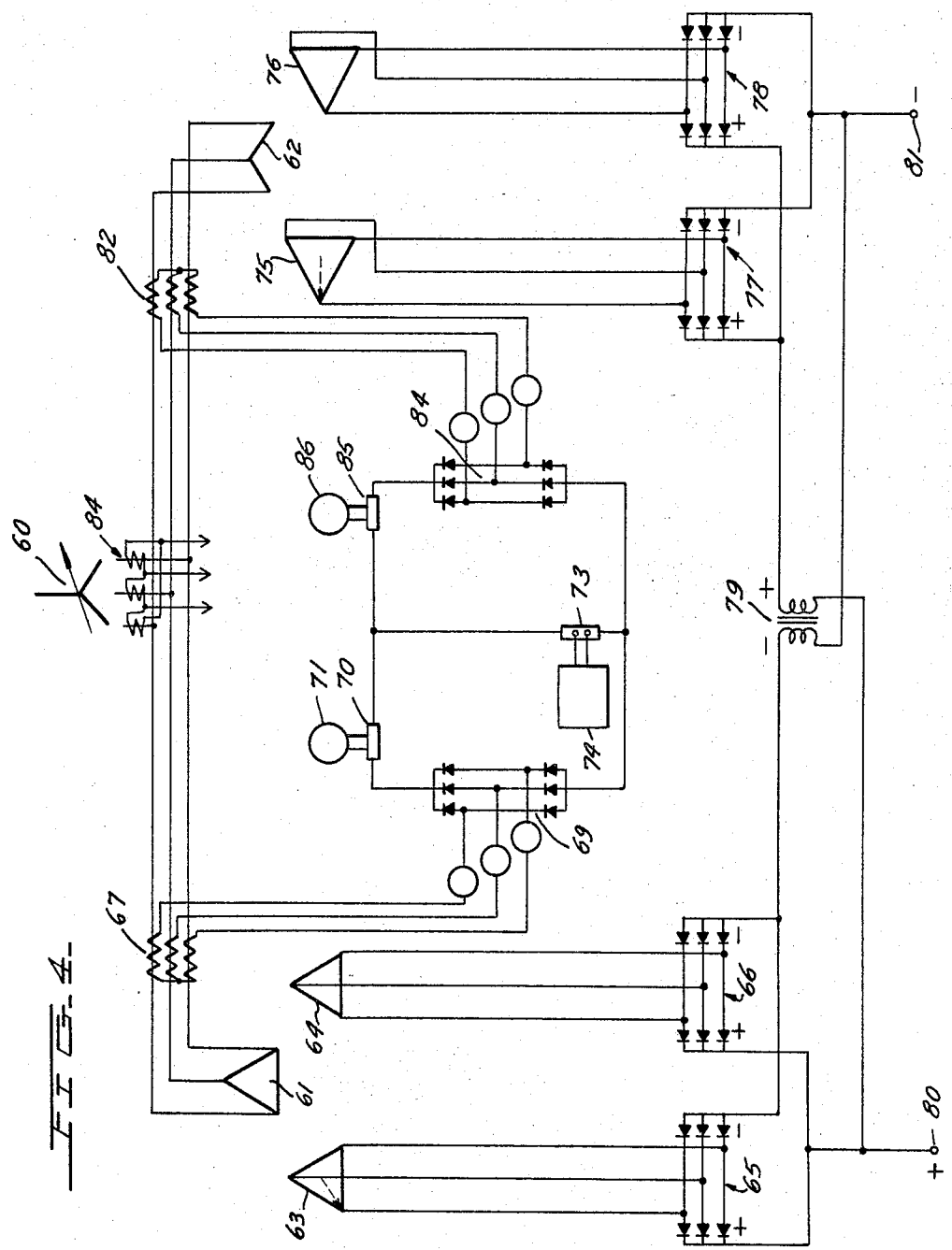
INVENTOR.
ISADORE K. DORTORT
BY
OSTROLENK, FABER, GERB & SOFFEN
ATTORNEYS United States Patent Office 3,281,642
Patented Oct. 25, 1966

3,281,642
A.-C. MEASUREMENT OF D.-C. OUTPUT
OF RECTIFIERS
Isadore K. Dortort, Philadelphia, Pa., assignor to I-T-E
Circuit Breaker Company, Philadelphia, Pa., a corporation of Pennsylvania
Filed Feb. 20, 1962, Ser. No. 174,588
13 Claims. (Cl. 321—16)

My invention relates to a novel measuring circuit for measuring the D.-C. output current of rectifiers, particularly those which have rated currents of the order of 5,000 amperes and more.

Many systems are presently known for the measurement of high D.-C. currents. Typical of these systems are the use of shunts in the D.-C. line which are accurate at small current ratings and are easily calibrated. When currents of relatively high magnitudes must be measured, however, the heat generated in the shunt and its bus connections leads to errors in the shunt reading. Moreover, severe overloads can cause a permanent change in the shunt characteristic. Furthermore, the use of such shunts in a corrosive atmosphere as encountered in the manufacture of chlorine, lead to shunt errors due to corroded lead connections and the like. Finally, the shunt leads and ammeters are necessarily connected directly to high power buses to present serious hazards to operating personnel and equipment. The invention described hereinafter is also useful for rectifiers delivering small currents at high D.-C. voltages without such hazard.

Another typical measuring system is in the use of D.-C. transductors which avoid many of the disadvantages listed above for shunts. The large D.-C. transductor, however, is expensive and extremely difficult to calibrate. Moreover, they are subject to errors due to stray D.-C. fields which cannot be eliminated by shielding. In practice, the totalization or summation of the outputs of many transductors to determine the total output current of many rectifier sections introduces additional errors.

Still another system uses the Hall generator which is extremely expensive, difficult to install, difficult to calibrate, and subject to error due to handling and shipment.

It has long been recognized that the D.-C. output current of a multiphase rectifier is proportional to the R.M.S. value of the current in the rectifier circuit elements for a constant overlap angle. Thus, a D.-C. measuring circuit can be provided which is energized from current transformers connected to the A.-C. side of the rectifier which measure the R.M.S. value of the current in the rectifier circuit elements. The current transformer is then connected to an appropriately calibrated A.-C. meter. However, with this system, once there is a change, for example, in primary voltage, or voltage reduction by phase control of any type, there will be a change in the overlap angle so that the calibrated meter will now read inaccurately.

I have recognized that, even with variable overlap angle, the average value of the rectifier circuit element current or the integrated ampere second value under the current wave form will remain constant. That is to say, when there is a change in overlap angle, the change in area at the beginning of the wave form will be compensated for by a similar change in area at the end of the wave form. Thus, the ampere second value will be directly proportional to the contribution of the circuit element to the direct-current output of the rectifier. Therefore, by applying a current transformer to each alternating current phase of a rectifier system, the total ampere seconds can be added in a metering rectifier bridge which is connected to a D.-C. meter. The D.-C. meter will give an accurate indication of the D.-C. output of the rectifier, even though there are changes in the overlap angle.

In large rectifier installations, it is common practice to have several rectifier units, each consisting of one rectifier transformer and one or more rectifier sections where the transformers are connected in different combinations such as one delta-wye and one delta-delta. This is done to improve wave shape and power factor without increasing the cost of the installation by phase shifting equipment.

In such cases, a wye-delta system or delta-wye system will be encountered whereby the fundamental of the delta-wye system line current will not be shifted with respect to that of a delta-delta system, but its harmonics will be shifted by 30° with respect to the fundamental. In such a case where overlap changes, the ampere second value under the current wave shape will not remain constant in the usual manner by causing complete cancellation of the overlap areas, but will, for example, lose more ampere seconds for a greater overlap angle so that the ammeter would read lower than it should read.

I have recognized that in such installations, a delta connected current transformer arrangement can be connected to the line terminals extending from the delta connected winding, or could be connected internally of the delta (where the currents have the simple wave shape) wherein changes in overlap angle do not affect the net ampere second value under the wave shape.

As an additional feature of the invention, and where several rectifier units are provided to supply a high current line such as an aluminum pot line which would require, for example, 75,000 amperes at 850 volts, it is desirable to have a totalizing meter which will indicate the total current flowing to the pot line from all of the rectifier sections. Moreover, and where the primary input voltage is regulated by a common regulating means, it is desirable that when one of the rectifier units is removed from the line, the complete line be automatically regulated down so that the remaining individual rectifiers will not be unduly overloaded.

To this end, the primary voltage regulating means has a sensing or operating element connected in the path which energizes the totalized current indicator. A resistor and switch which correspond to each of the rectifier units respectively is then connected directly in parallel with this sensing means, whereby each of the switches are normally closed, for example, to develop a particular voltage across the sensing means.

When a unit is removed from the line, its respective switch is opened so that the total parallel resistance across the sensing means is increased so that a greater voltage now appears across the regulator or sensing means to cause it to reduce the primary voltage, whereby the current through the remaining rectifier sections will remain at their previous respective levels.

Accordingly, a primary object of this invention is to provide a novel D.-C. current measuring system for rectifier systems having output currents of the order of 5,000 amperes and more, or D.-C. voltages of 600 v. or more.

Another object of this invention is to provide a novel totalizing system for high current output rectifier systems.

A still further object of this invention is to provide a novel current transformer measuring system for high output current rectifier systems in which a current transformer is provided for each phase of a three-phase line, and is connected in delta where the power transformer is of the delta-wye type or wye-delta type.

These and other objects of this invention will become apparent from the following description when taken in connection with the drawings, in which:

FIGURE 1 illustrates a schematic diagram of a delta-wye connected rectifier transformer in a rectifier system wherein current transformers and a D.-C. ammeter are provided in accordance with the invention.

FIGURE 2 shows the wave shape of the primary current in the delta connected transformer winding of FIGURE 1.

FIGURE 3 shows the primary line current which is the difference between the transformer winding currents of adjacent transformer windings in the delta connection of FIGURE 1.

FIGURE 4 illustrates two double section rectifiers in which the currents of the section are totalized by measuring the total input current of the rectifier transformer.

FIGURE 5 illustrates the novel totalizing system of the invention where the totalizing is combined with regulation control of the primary voltage of the rectifier system.

Referring first to FIGURE 1, I have shown therein a three-phase line which includes phases A, B and C which are connected to the delta connected primary winding 10 of rectifier power transformer 11. The power transformer 11 is provided with a wye connected secondary winding 12 which is connected to a rectifier system 13 which is a three-phase bridge connected system having output terminals 14 and 15.

The bridge connected system 13 is schematically illustrated as including a single semiconductor rectifier cell for each arm of the bridge. In reality, and where the system is for high currents which could be of the order of 5,000 amperes or more at terminals 14 and 15, each of the arms will be formed of a plurality of series and parallel connected cells to meet the required voltage and current requirements of the system.

In accordance with the invention, and in order to measure the output current at terminals 14 and 15, I have provided a novel current transformer system which includes current transformer secondary windings 16, 17 and 18 which are connected in delta and are connected to the three-phase full wave rectifier bridge 19. The output of rectifier bridge 19 is then connected to a D.-C. ammeter 20 which will give an accurate indication of the output current at terminals 14 and 15, even though the overlap angle of the system varies.

The manner in which the system of FIGURE 1 operates may be best understood by reference to FIGURES 2 and 3. Referring first to FIGURE 2, I have illustrated therein the current wave shape of one of the phases for any one of the windings of secondary winding 12 and primary winding 11. The current wave form shown in FIGURE 2 in typical rectifier wave form and, at time $t_0$ the current begins to commutate from the preceding adjacent phase until at time $t_1$ the current reaches the magnitude of the output direct current. The current then remains at this value until time $t_2$, at which time it begins to commutate to the following adjacent phase and decreases to zero at time $t_3$. Thereafter, the current of the phase remains at zero for a while and reverses at time $t_4$, and repeats the same process at an opposite polarity. The time interval time $t_0$ to $t_4$ is 180°. The overlap angle $u$ is shown in FIGURE 2 as the angle between time $t_2$ and time $t_3$. It is the same as the angle between $t_0$ and $t_1$. Under varying conditions, such as an increased input voltage or change in phase control, the overlap angle $u$ will change, even though the output current is held constant.

I have recognized that the total area under the wave shape of one polarity of FIGURE 2 is a function of the D.-C. output current of the phase in consideration. Moreover, I have recognized that when there is a change in the overlap angle, the areas 30 and 31 change in exactly the same manner so that even under changing overlap conditions, the integrated area under the wave shape will continue to be an accurate representation of the D.-C. output current. Accordingly, in the general case, and where such wave shapes exist, it is possible to apply current transformers to each of the alternating current phases of the rectifier, and to rectify the current transformer secondary current and apply this current to a meter which will accurately represent the D.-C. output current of the phase. This can be done directly in the normal manner when using delta-delta or Y-Y rectifier transformers, or when using current transformers in the A.-C. leads between the transformer and rectifier. The currents of each of the phases can, of course, be totalized to give the total output current of any particular rectifier section.

However, where the windings are connected delta-Y, as indicated in FIGURE 1, or Y-delta the line current to the primary winding alters in the manner shown in FIGURE 3. That is to say, the curve of FIGURE 2 accurately represents the current through any of the windings of the delta-Y transformer but each line current is the difference of two winding currents. The fundamental component of the primary line current through the lines identified as phase A, B and C is not phase shifted with respect to the fundamental components of the line currents of delta-delta rectifier transformer, but its harmonics are shifted 30° with respect to the fundamental so that the wave shape of the line currents connected to the delta connected winding is that shown in FIGURE 3. This wave shape will be the difference between the currents in two contiguous windings. That is to say, FIGURE 3 accurately represents the difference in the current through winding portion 32 of delta connected winding 10 and winding portion 33 of delta connected winding 10.

With this arrangement, there are four commutation areas 40, 41, 42 and 43 in the half-cycle wave shape 40 and 43 being partial. The areas 41 and 42 will exactly cancel one another out, but the areas 40 and 43 will not cancel one another out, since the area 40 will be considerably larger than area 43. Therefore, an ammeter which monitors the wave form of FIGURE 3 through the rectified output of a current transformer will read lower than the actual current flowing in the system.

I have found that this problem can be overcome by connecting the secondaries of the current transformers in each phase in a delta connected ararngement, as illustrated in FIGURE 1. The secondary currents of the current transformers will then be the same as in FIGURE 3, while the current in the leads to the instrument rectifier 19 is the difference between two such waves displaced by 120° to thereby restore the original wave shape of FIGURE 2. Clearly, a similar result could be obtained by connecting the current transformers inside the delta, as schematically illustrated by current transformers 50, 51 and 52, but this would complicate the construction of the power transformers. In such a case, however, the output current wave shape of FIGURE 2 would be directly measured, and the CT secondary windings would be connected in wye.

FIGURE 4 illustrates a wye-double-delta and delta-double-delta connected rectifier units of a four-section rectifier system and particularly illustrates the manner in which current may be totalized. In FIGURE 4, I have illustrated a three-phase input power system which is schematically illustrated as taken through a regulator system 60 which could be an induction regulator or tap changer transformer. The regulated output of regulator 60 is then connected to the primary delta winding 61 of a first rectifier system half and the wye connected primary winding 62 of the power transformer of a second half of the rectifier system. Primary winding 61 is associated with delta connected secondary windings 63 and 64 of two rectifier sections which are connected to rectifier elements 65 and 66 respectively. Since all of transformer windings 61, 63 and 64 are delta connected, the output current may be directly measured by current transformers in normal connection without fear of harmonic displacement of the current wave forms. Thus, the left-hand rectifier system half is provided with current transformer system 67 which is connected in wye and then connected to a three-phase full wave instrument rectifier bridge 69. The output of rectifier bridge 69 is connected in series with a D.-C. ammeter shunt 70 which energizes the D.C. ammeter 71, and a totalizing shunt 73 for the rectifier system totalizing meter 74.

The other rectifier half comprises a wye-double-delta connected rectifier which, in combination with the delta system of the left-hand half, provides an improved wave form for the rectifier output. Thus, primary winding 62 energizes the two delta connected windings 75 and 76 which are, in turn, connected to drive rectifier elements 77 and 78 respectively. The output of rectifiers 77 and 78 are combined in an appropriate interphase transformer 79 with the output of rectifier element 65 and 66 to energize a common output bus system which includes positive output terminal 80 and negative output terminal 81.

The delta connected windings 75 and 76 have output line currents having a wave shape shown in FIGURE 2. Thus, the Y-connected current transformers system 82 of the systems including windings 75 and 76 respectively have an output like that of FIGURE 2 so that a proper instrument reading will be obtained. Thus, the instrument rectifier 84 is connected in series with shunt 85 of D.-C. instrument 86 which indicates the current in the right-hand rectifier half, and totalizing shunt 73.

Clearly, totalizing shunt 73 receives current from both rectifier halves so that meter 74 indicates the total output current of the four rectifier sections. Note that the two instrument rectifier systems 69 and 84 are identical but shifted 30° from each other.

Alternative to this arrangement, a single delta connected current transformer 84 can be connected as shown to drive a single indicator within acceptable degree of accuracy for many applications.

FIGURE 5 illustrates the novel totalizing system of a rectifier system such as that of FIGURE 4 wherein the totalizing structure automatically controls regulation of regulator 60 of FIGURE 4. The rectifier units are schematically illustrated as rectifier units 63, 64, 75 and 76 which correspond to the rectifier sections which include secondary windings 63, 64, 75 and 76 respectively in FIGURE 4.

Each of the rectifier transformers of rectifiers 63, 64, 75 and 76 may have wye or delta primaries, and in addition may have phase shifters connected ahead of them. Also, each transformer may have one or more secondaries, wye or delta connected. The current transformers may be in the primary or secondary leads.

The input power to the rectifier units of FIGURE 5 is further schematically illustrated as being controlled by a primary voltage regulating means 60 which corresponds to the regulator 60 of FIGURE 4.

The rectifier units are then schematically illustrated as having output D.-C. terminals, and as also having individual D.-C. ammeters 90, 91, 92 and 93. It will be clear that meters 90 through 93 are energized by delta or wye connected current transformers and instrument rectifiers, according to the wave shape of the current in the leads in which the current transformers are connected. Thus, each of meters 90 through 93 will indicate the current in its respective rectifier section.

The circuits containing meters 90 through 93 are then connected parallel with one another and in series with a totalizing meter 94 which will read the total current of the rectifier system.

In accordance with the totalizing aspect of the invention, the circuit including totalizing meter 94 may be connected in series with parallel connected resistors 95, 96, 97 and 98 which are in series with contacts 99, 100, 101 and 102, and in further series with a regulator sensing means 103 which is connected to regulator 60 and controls the regulation operation of regulator 60, at least in part.

Each of the parallel circuits of resistor and switch are associated with a respective rectifier sections 63, 64, 75 and 76 respectively. Moreover, switches 99 through 102 are normally closed switches which are opened responsive to the disconnection of their respective rectifier section from the line. For purposes of illustration, a dotted line represents the connection between rectifier section 63 and normally closed switch 99. Thus, so long as all of the rectifier sections are connected to the line such as an aluminum pot line, the primary voltage as adjusted by regulator means 60 is such that 25% of the rated current is supplied by each of the rectifier sections. If it is now necessary to disconnect one of the rectifier sections as for maintenance, and if the primary voltage is not adjusted, it will be obvious that the remaining three rectifiers will each be overloaded.

In accordance with the invention, however, and assuming that section 63 is removed from the line, the switch 99 will be automatically opened. Therefore, the voltage on sensing means 103 will be changed so that the regulator 60 will be operated to a new primary voltage level whereby the output current of rectifiers 64, 75 and 76 will be at their rated current with the total output current being decreased by 25%.

Clearly, if desired, the totalizing current through meter 94 could be applied to a shunt having the sensing means 103 in parallel therewith and in series with resistors which could be shorted out by respective auxiliary switches operated from the respective rectifier sections.

Neither of these two simple systems provide accurate recalibration if more than one rectifier is disconnected, but obviously more complex systems can be devised to provide any degree of accuracy desired.

Although I have described preferred embodiments of my novel invention, many variations and modifications will now be obvious to those skilled in the art, and I prefer, therefore, to be limited not by the specific disclosure herein but only by the appended claims.

I claim:

1. An output D.-C. current measuring system for multiphase rectifiers having power transformers with a Y connected winding system and a delta connected winding system; said system including a current transformer for measuring current in each of said rectifier phases, an instrument rectifier means and a D.-C. meter; said current transformers having output windings connected in delta; said delta connected windings being connected to said instrument rectifier means; said instrument rectifier means being connected to said D.-C. meter; the ampere seconds of the current wave shape applied to said current transformer being unaffected by changes in overlap angle.

2. An output D.-C. current measuring system for multiphase rectifiers having power transformers with a Y connected winding system and a delta connected winding system; said system including a current transformer for measuring current in each of said rectifier phases, an instrument rectifier means and a D.-C. meter; said current transformers having output windings connected in delta; said delta connected windings being connected to said instrument rectifier means; said instrument rectifier means being connected to said D.-C. meter; the ampere seconds of the current wave shape applied to said current transformer being unaffected by changes in overlap angle; said instrument rectifier means being a three phase bridge connected rectifier.

3. An output D.-C. current measuring system for multiphase rectifiers having power transformers with a Y connected winding system and a delta connected winding system; said system including a current transformer for measuring current in each of said rectifier phases, an instrument rectifier means and a D.-C. meter; said current transformers having output windings connected in delta; said delta connected windings being connected to said instrument rectifier means; said instrument rectifier means being connected to said D.-C. meter; the ampere seconds of the current wave shape applied to said current transformer being unaffected by changes in overlap angle; said current transformers being connected in the lines leading to the delta connected winding of said delta connected winding system.

4. An output D.-C. current measuring system for multiphase rectifiers having power transformers with a Y connected winding system and a delta connected winding system; said system including a current transformer for measuring current in each of said rectifier phases, an instrument rectifier means and a D.-C. meter; said current transformers having output windings connected in delta; said delta connected windings being connected to said instrument rectifier means; said instrument rectifier means being connected to said D.-C. meter; the ampere seconds of the current wave shape applied to said current transformer being unaffected by changes in overlap angle; said current transformers being connected within the delta connected winding of said delta connected winding system.

5. An output D.-C. current measuring system for multiphase rectifiers having power transformers with a Y connected winding system and a delta connected winding system; said system including a current transformer for measuring current in each of said rectifier phases, an instrument rectifier means and a D.-C. meter; said current transformers having output windings connected in delta; said delta connected windings being connected to said instrument rectifier means; said instrument rectifier means being connected to said D.-C. meter; the ampere seconds of the current wave shape applied to said current transformer being unaffected by changes in overlap angle; said delta connected winding system being the primary winding of said power transformer.

6. An output D.-C. current measuring system for multiphase rectifiers having power transformers with a Y connected winding system and a delta connected winding system; said system including a current transformer for measuring current in each of said rectifier phases, an instrument rectifier means and a D.-C. meter; said current transformers having output windings connected in delta; said delta connected windings being connected to said instrument rectifier means; said instrument rectifier means being connected to said D.-C. meter; the ampere seconds of the current wave shape applied to said current transformer being unaffected by changes in overlap angle; said delta connected winding system being the secondary winding of said power transformer.

7. In a high power rectifier system; a first multiphase rectifier unit, a second multiphase rectifier unit and a power transformer means for connecting a multiphase A.-C. source to said first and second rectifier unit; said power transformer means including a Y connected winding and a delta connected winding for connecting said A.-C. source to said first rectifier unit and a combination of windings other than a Y and delta combination for connecting said A.-C. source to said second rectifier unit; a D.-C. current measuring system for measuring the current output of said first rectifier unit; said measuring system including current transformers for measuring current in each of said phases of said first rectifier unit, an instrument rectifier and a D.-C. meter connected to the output of said instrument rectifier; said current transformers having output windings connected in delta; said delta connected output windings being connected to said instrument rectifier.

8. In a high power rectifier system; a first multiphase rectifier unit, a second multiphase rectifier unit and a power transformer means for connecting a multiphase A.-C. source to said first and second rectifier units; said power transformer means including a Y connected winding and a delta connected winding for connecting said A.-C. source to said first rectifier unit and a combination of windings other than a Y and delta combination for connecting said A.-C. source to said second rectifier unit; a D.-C. current measuring system for measuring the current output of said first rectifier unit; said measuring system including current transformers for measuring current in each of said phases of said first rectifier unit, an instrument rectifier and a D.-C. meter connected to the output of said instrument rectifier; said current transformers having output windings connected in delta; said delta connected output windings being connected to said instrument rectifier; said instrument rectifier being a three-phase bridge connected rectifier.

9. In a high power rectifier system; a first multiphase rectifier unit, a second multiphase rectifier unit and a power transformer means for connecting a multiphase A.-C. source to said first and second rectifier units; said power transformer means including a Y connected winding and a delta connected winding for connecting said A.-C. source to said first rectifier unit and a combination of windings other than a Y and delta combination for connecting said A.-C. source to said second rectifier unit; a D.-C. current measuring system for measuring the current output of said first rectifier section; said measuring system including current transformers for measuring current in each of said phases of said first rectifier unit, an instrument rectifier and a D.-C. meter connected to the output of said instrument rectifier; said current transformers having output windings connected in delta; said delta connected output windings being connected to said instrument rectifier; said instrument rectifier being a three-phase bridge connected rectifier; said current transformers being connected in the lines leading to the delta connected primary winding of said delta connected winding system.

10. In a high power rectifier system; a first multiphase rectifier unit, a second multiphase rectifier unit and a power transformer means for connecting a multiphase A.-C. source to said first and second rectifier units; said power transformer means including a Y connected winding and a delta connected winding for connecting said A.-C. source to said first rectifier unit and a combination of windings other than a Y and delta combination for connecting said A.-C. source to said second rectifier unit; a D.-C. current measuring system for measuring the current output of said first rectifier unit; said measuring system including current transformers for measuring current in each of said phases of said first rectifier unit, an instrument rectifier and a D.-C. meter connected to the output of said instrument rectifier; said current transformers having output windings connected in delta; said delta connected output windings being connected to said instrument rectifier; said instrument rectifier being a three-phase bridge connected rectifier; said current transformers being connected within the delta connected winding of said delta connected winding system.

11. In a high power rectifier system; a first multiphase rectifier unit, a second multiphase rectifier unit and a power transformer means for connecting a multiphase A.-C. source to said first and second rectifier units; said power transformer means including a Y connected winding and a delta connected winding for connecting said A.-C. source to said first rectifier system unit and a combination of windings other than a Y and delta combination for connecting said A.-C. source to said second rectifier unit; a D.-C. current measuring system for measuring the current output of said first rectifier unit; said measuring system including current transformers for measuring current in each of said phases of said first rectifier section, an instrument rectifier and a D.-C. meter connected to the output of said instrument rectifier; said current transformers having output windings connected in delta; said delta connected output windings being connected to said instrument rectifier; and a totalizing circuit for totalizing the measurement of the reading of said D.-C. meter and a D.-C. metering system connected to said second rectifier unit.

12. In a high power rectifier system; a first multiphase rectifier unit, a second multiphase rectifier unit and a power transformer means for connecting a multiphase A.-C. source to said first and second rectifier units; said power transformer means including a Y connected winding and a delta connected winding for connecting said A.-C. source to said first rectifier unit and a combination of windings other than a Y and delta combination for connecting said A.-C. source to said second rectifier unit; a D.-C. current measuring system for measuring the current output of said first rectifier unit; said measuring system including current transformers for measuring current in each of said phases of said first rectifier unit, an instrument rectifier and a D.-C. meter connected to the output of said instrument rectifier; said current transformers having output windings connected in delta; said delta connected output windings being connected to said instrument rectifier; and a totalizing circuit for totalizing the measurement of the reading of said D.-C. meter and a D.-C. metering system connected to said second rectifier section; said power transformer means including regulating means; a sensing means; said sensing means being connected in said totalizing circuit and connected to said regulating means; said regulating means operable responsive to the operation of said sensing means.

13. In a high power rectifier system; a first multiphase rectifier unit, a second multiphase rectifier unit and a power transformer means for connecting a multiphase A.-C. source to said first and second rectifier units; said power transformer means including a Y connected winding and a delta connected winding for connecting said A.-C. source to said first rectifier unit and a combination of windings other than a Y and delta combination for connecting said A.-C. source to said second rectifier unit; a D.-C. current measuring system for measuring the current output of said first rectifier section; said measuring system including current transformers for measuring current in each of said phases of said first rectifier unit, an instrument rectifier and a D.-C. meter connected to the output of said instrument rectifier; said current transformers having output windings connected in delta; said delta connected output windings being connected to said instrument rectifier; and a totalizing circuit for totalizing the measurement of the reading of said D.-C. meter and a D.-C. metering system connected to said second rectifier unit; said power transformer means including regulating means; a sensing means; said sensing means being connected in said totalizing circuit and connected to said regulating means; said regulating means operable responsive to the operation of said sensing means; said totalizing circuit including switching means for each of said first and second rectifier units; said switching means being operable responsive to connection or disconnection of their respective sections from a common output to change the level of operation of said regulating means.

References Cited by the Examiner

UNITED STATES PATENTS

| | | | |
|---|---|---|---|
| 1,580,408 | 4/1926 | Cheetham | 324—107 |
| 1,599,575 | 9/1926 | MacGahan | 324—107 X |
| 2,071,834 | 2/1937 | Harder | 324—107 X |
| 2,154,270 | 4/1939 | Harder | 324—107 |
| 2,474,290 | 6/1949 | Terry et al. | 324—86 X |
| 2,742,579 | 4/1956 | Stevens et al. | 321—27 X |
| 3,069,614 | 12/1962 | Steinert et al. | 321—27 X |
| 3,200,392 | 8/1965 | Chumakov | 321—11 |

FOREIGN PATENTS

| | | |
|---|---|---|
| 357,347 | 9/1931 | Great Britain. |
| 670,536 | 4/1952 | Great Britain. |

JOHN F. COUCH, *Primary Examiner.*

LLOYD McCOLLUM, MILTON O. HIRSHFIELD,
*Examiners.*

G. H. GERSTMAN, M. L. WACHTELL,
*Assistant Examiners.*